United States Patent
Johnson (10) Patent No.: US 9,806,665 B2
(45) Date of Patent: *Oct. 31, 2017

(54) METHODS AND APPARATUS FOR CONTROLLING OPERATION OF PHOTOVOLTAIC POWER PLANTS

(71) Applicant: SunPower Corporation, San Jose, CA (US)

(72) Inventor: Lars Johnson, Concord, CA (US)

(73) Assignee: SunPower Corporation, San Jose, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/723,107

(22) Filed: May 27, 2015

(65) Prior Publication Data

US 2015/0326168 A1    Nov. 12, 2015

Related U.S. Application Data

(63) Continuation of application No. 13/169,978, filed on Jun. 27, 2011, now Pat. No. 9,059,604.

(51) Int. Cl.
| | |
|---|---|
| *H02M 7/44* | (2006.01) |
| *H02J 1/10* | (2006.01) |
| *H02S 10/00* | (2014.01) |
| *G05B 11/42* | (2006.01) |
| *H02J 3/38* | (2006.01) |
| *H02S 50/00* | (2014.01) |

(52) U.S. Cl.
CPC .............. *H02S 10/00* (2013.01); *G05B 11/42* (2013.01); *H02J 3/383* (2013.01); *H02S 50/00* (2013.01); *Y02E 10/563* (2013.01); *Y10T 307/549* (2015.04)

(58) Field of Classification Search
USPC .............................................. 363/95; 307/51
See application file for complete search history.

(56) References Cited

U.S. PATENT DOCUMENTS

2010/0138061 A1* 6/2010 Walling .................. H02J 3/383
                                                                 700/287

* cited by examiner

*Primary Examiner* — Rexford Barnie
*Assistant Examiner* — Dru Parries
(74) *Attorney, Agent, or Firm* — Okamoto & Benedicto LLP (57) ABSTRACT

A photovoltaic power plant includes a photovoltaic inverter that converts direct current generated by solar cells to alternating current. The output of the photovoltaic inverter is provided to a point of interconnection to a power grid. A meter at the point of interconnection may be read to detect the output of the photovoltaic inverter at the power grid. The photovoltaic power plant includes a plant controller with a state machine. The plant controller is configured to adjust setpoints of the photovoltaic inverter to control the output of the photovoltaic power plant. The plant controller is also configured to soft start and soft stop automatic voltage regulation (AVR) of the photovoltaic power plant to prevent perturbing the AVR.

20 Claims, 11 Drawing Sheets

METHODS AND APPARATUS FOR CONTROLLING OPERATION OF PHOTOVOLTAIC POWER PLANTS

CROSS-REFERENCE TO RELATED APPLICATION

This application is a continuation of U.S. application Ser. No. 13/169,978, filed on Jun. 27, 2011, which is incorporated herein by reference in its entirety.

TECHNICAL FIELD

The present invention relates to photovoltaic power plants.

BACKGROUND

Photovoltaic power plants employ photovoltaic systems to generate electricity from solar radiation. A photovoltaic system may comprise arrays of solar panels, with each solar panel comprising interconnected solar cells. A solar cell includes P-type and N-type diffusion regions. Solar radiation impinging on the solar cell creates electrons and holes that migrate to the diffusion regions, thereby creating voltage differentials between the diffusion regions. In a backside contact solar cell, both the diffusion regions and the metal contact fingers coupled to them are on the backside of the solar cell. The contact fingers allow an external electrical circuit to be coupled to and be powered by the solar cell.

A photovoltaic inverter converts direct current generated by the solar cells to alternating current suitable for coupling to a power grid at a point of interconnection (POI). The output of the photovoltaic power plant at the POI, such as reactive power, real power, and power factor, are controlled to be within a range of specified values to meet requirements. Embodiments of the present invention pertain to methods and apparatus for controlling the operation of the photovoltaic power plant to control the photovoltaic power plant output at the POI or other delivery node.

BRIEF SUMMARY

In one embodiment, a method of controlling operation of a photovoltaic power plant comprises generating direct current using a plurality of solar cells. The direct current generated by the solar cells is converted to alternating current using a photovoltaic inverter. The output of the photovoltaic inverter is coupled to a power grid. The photovoltaic power plant is detected to generate a photovoltaic power plant output that exceeds a maximum allowable output limit of the photovoltaic power plant. In response to detecting that the photovoltaic power plant generates a photovoltaic power plant output that exceeds the maximum allowable output limit of the photovoltaic power plant, a setpoint variable limit of the photovoltaic inverter is lowered from a first inverter setpoint limit to a second inverter setpoint limit.

In another embodiment, a method of controlling operation of a photovoltaic power plant comprises detecting that a real power output of the photovoltaic power plant is below a minimum real power generation level. In response to detecting that the real power output of the photovoltaic power plant is below the minimum real power generation level, a reactive power setpoint of a photovoltaic inverter of the photovoltaic power plant is ramped down to unity power factor.

In another embodiment, a photovoltaic power plant comprises a plurality of solar cells, a photovoltaic inverter configured to convert direct current generated by the plurality of solar cells to alternating current, a meter configured to detect an output of the photovoltaic inverter at a point of interconnection to a power grid, and a plant controller comprising a state machine. The plant controller is configured to read the meter to detect the output of the photovoltaic power plant at the point of interconnection in a first state of operation and to dynamically adjust a setpoint variable limit of the photovoltaic inverter from a first inverter setpoint limit to a second inverter setpoint limit when the output of the photovoltaic power plant exceeds a maximum allowable output.

In another embodiment, a photovoltaic power plant comprises a plurality of solar cells, a photovoltaic inverter configured to convert direct current generated by the plurality of solar cells to alternating current, a meter configured to detect an output of the photovoltaic inverter at a point of interconnection to a power grid, and a plant controller. The plant controller is configured to read the meter to detect a real power output of the photovoltaic power plant at the point of interconnection, to compare the real power output of the photovoltaic power plant to a minimum real power generation level, and to ramp down a reactive power setpoint of the photovoltaic inverter to unity power factor in response to detecting the real power output of the photovoltaic power plant to be below the minimum real power generation level.

These and other features of the present invention will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
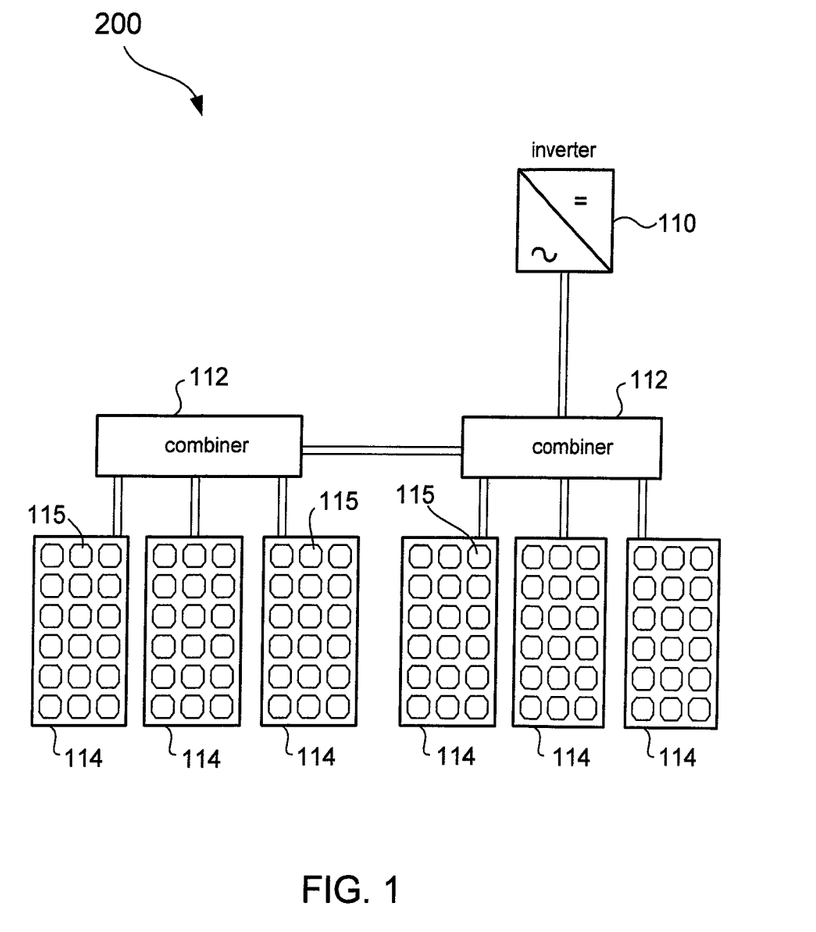
FIG. 1 schematically shows components of a photovoltaic power plant in accordance with an embodiment of the present invention.

FIG. 1 schematically shows components of a photovoltaic power plant 200 in accordance with an embodiment of the present invention. The components of the photovoltaic power plant 200 shown in the example of FIG. 1 include a plurality of combiner boxes 112, a plurality of solar panels 114, and a photovoltaic inverter 110. A photovoltaic power plant may include a plurality of photovoltaic inverters but only one is shown in FIG. 1 for clarity of illustration. A solar panel 114 comprises electrically connected solar cells mounted on the same frame. In one embodiment, each solar panel 114 comprises a plurality of serially-connected backside contact solar cells 115. Front contact solar cells may also be employed. Only some of the backside contact solar cells 115 have been labeled in FIG. 1 for clarity of illustration.

A photovoltaic string comprises a plurality of serially-connected solar panels 114 as in FIG. 1. A group of solar panels 114 is electrically connected to a combiner box 112, where the solar panels 114 are connected in series. The combiner boxes 112 are electrically connected such that that all solar panels 114 in the photovoltaic string are serially-connected. The output of the photovoltaic string is electrically connected to the inverter 110, which converts direct current (DC) generated by the solar cells 115 to alternating current (AC) suitable for delivery to a utility power grid, for example.

Figure 2:
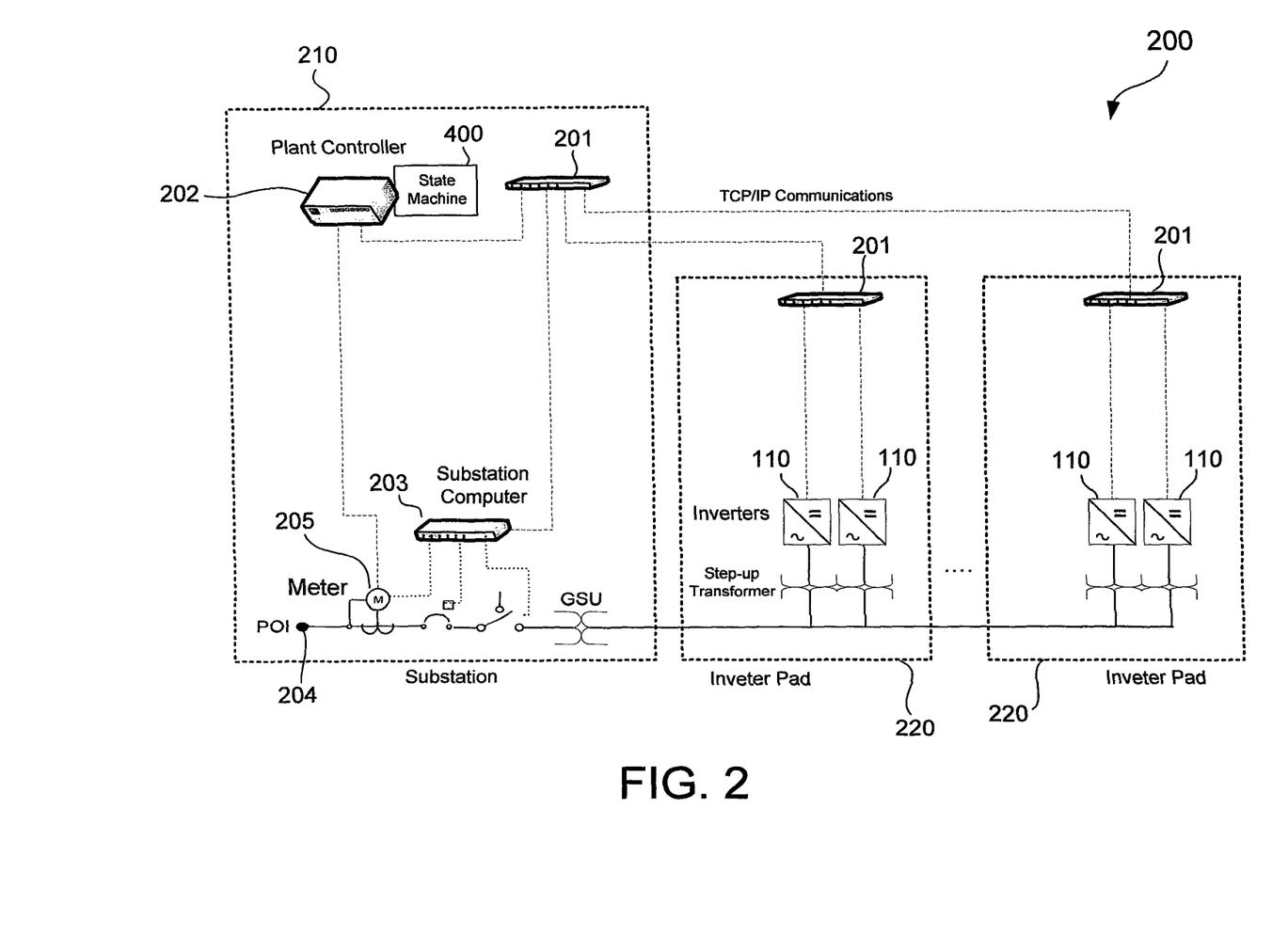
FIG. 2 schematically shows additional components of the photovoltaic power plant in accordance with an embodiment of the present invention.

FIG. 2 schematically shows additional components of the photovoltaic power plant 200 in accordance with an embodiment of the present invention. FIG. 2 shows the inverters 110 described in connection with FIG. 1. The solar panels 114 are not shown in FIG. 2 for clarity of illustration. In the example of FIG. 2, the components of the photovoltaic power plant 200 are located in a photovoltaic substation 210 and inverter pads 220.

An inverter pad 220 is a general area where inverters are located. The inverter pads 220 are typically located away from the substation 210, far from the point of interconnection (POI) 204 with the power grid. Communication modules 201 allow for data communications between the inverters 110 and components located in the substation 210. An inverter pad 220 may also include additional components that are not specifically shown in FIG. 2, such as analog to digital converters, digital to analog converters, and other components for supporting the operation of the inverters 110.

In one embodiment, the operation of the photovoltaic power plant 200 is controlled using Supervisory Control and Data Acquisition (SCADA), with the plant controller 202 serving as the central control computer. In one embodiment, the inverters 110, the plant controller 202, and a substation computer 203 communicate in accordance with the Modbus TCP/IP communications protocol. In that embodiment, the communication modules 201 comprise Ethernet switches that provide data communication links between components of the photovoltaic power plant 200. Monitoring and control may also be performed by analog signaling, such as by providing individual wiring for signals.

In the example of FIG. 2, a step-up transformer in an inverter pad 220 steps-up the AC voltage output of an inverter 110 to a higher voltage for distribution to the substation 210. Also in the example of FIG. 2, a generator step-up (GSU) transformer in the substation 210 further steps-up the AC voltage received from the inverter pads 220 before being coupled to the POI 204 for distribution to the power grid (not shown). A substation computer 203 allows for control and monitoring of the substation 210. The substation computer 203 may be configured to control protective circuits and read the voltage at the POI 204 by way of a meter 205. The meter 205 may comprise a conventional electrical meter or other sensing element, e.g., an RMS transmitter.

A plant controller 202 in the substation 210 may comprise a special-purpose or general-purpose computer configured to facilitate control of the voltage, power factor, real power, or reactive power at (or near) the POI 204. In the example of FIG. 2, the plant controller 202 includes a state machine 400 for dynamically limiting the reactive power, power factor of the photovoltaic power plant 200, and/or inverter terminal voltages, and for providing a soft start and soft stop of automatic voltage regulation.

In one embodiment, the plant controller 202 is configured to read the POI meter 205 to detect an output (e.g., reactive power, power factor) of the photovoltaic power plant 200 at the POI 204 in a first state of operation and to dynamically adjust a setpoint variable limit of the photovoltaic inverters 110 (e.g., inverter reactive power or power factor setpoint) from a first inverter setpoint limit to a second inverter setpoint limit when the output of the photovoltaic power plant 200 exceeds a maximum allowable output (e.g., maximum reactive power or power factor).

In one embodiment, the plant controller 202 is configured to read the POI meter 205 to detect a real power output of the photovoltaic power plant 200 at the POI 204, to compare the real power output of the photovoltaic power plant 204 to a minimum real power generation level, and to ramp down a reactive power setpoint of the photovoltaic inverters 110 to unity power factor (i.e., 1.0 PF or zero reactive power) in response to detecting that the real power output of the photovoltaic power plant 200 is below the minimum real power generation level. The plant controller 202 may be further configured to ramp up the reactive power setpoint of the photovoltaic inverters 110 to increase the reactive power output of the photovoltaic power plant 200 in response to detecting that the real power output of the photovoltaic power plant 200 is above an enabling real power generation level that is higher than the minimum real power generation level.

The voltage at a point of interconnection may be controlled by automatic voltage regulation (AVR). Generally speaking, AVR may involve manipulation of reactive power export/import from the photovoltaic power plant by manipulating reactive and/or power factor setpoints of the inverter to control the voltage at the point of interconnection with the distribution, transmission, or other electrical connection to the grid. AVR may also be employed to coordinate operation of a photovoltaic power plant with reactive power sources, such as static VAR compensators and capacitive banks.

Figure 3:
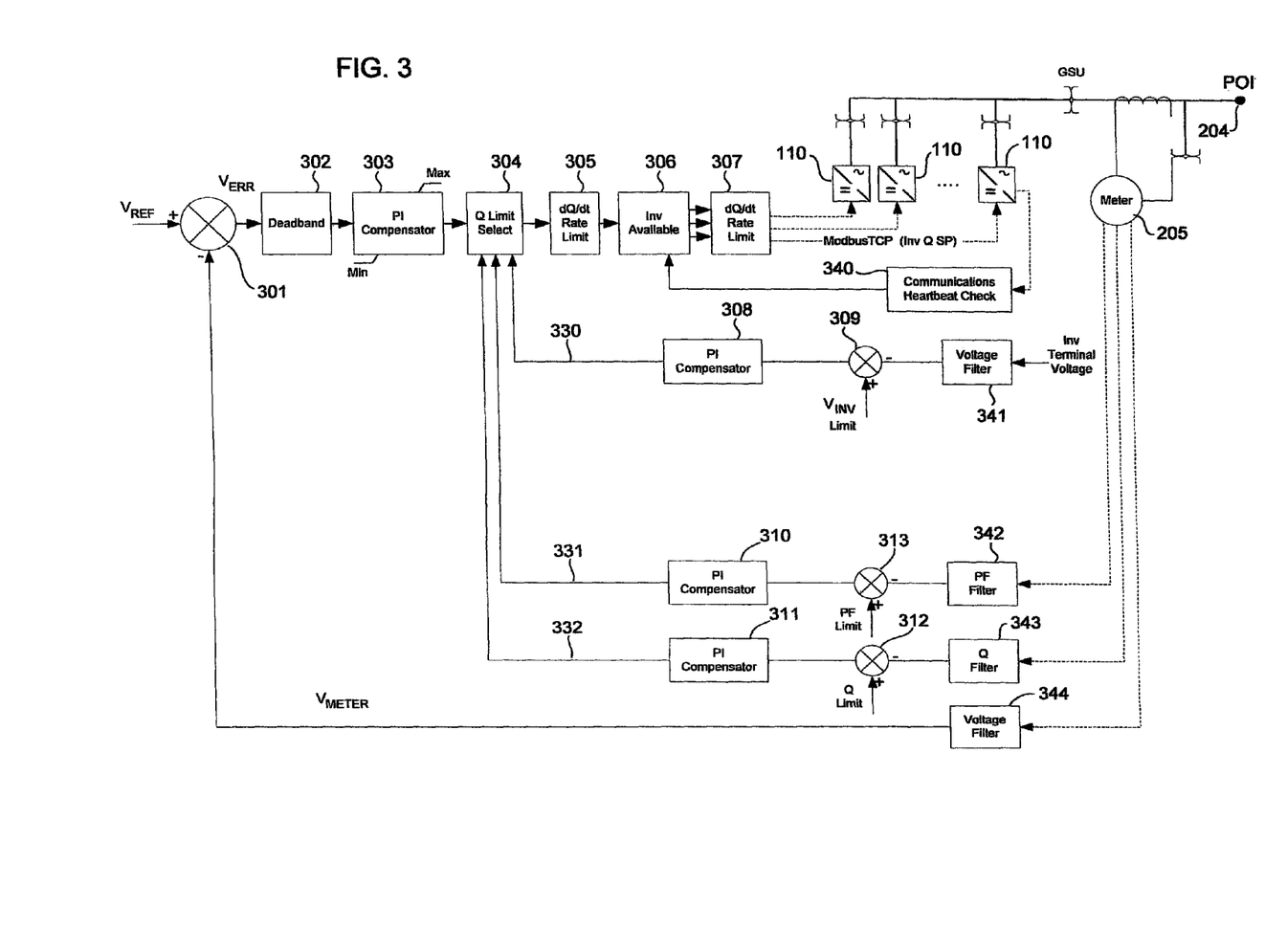
FIG. 3 schematically shows further details of the photovoltaic power plant in accordance with an embodiment of the present invention.

FIG. 3 schematically shows further details of the photovoltaic power plant 200 in accordance with an embodiment of the present invention.

In the example of FIG. 3, the function blocks 301-313 are performed by the plant controller 202. As can be appreciated, these functions may be implemented in software, hardware, or combination of hardware/software. For example, the plant controller 202 may comprise a computer with hardware interfaces for analog input direct measurement and control, data communications (e.g., Ethernet network adapter), data acquisition (e.g., to receive signals) and control (e.g., to send control signals), and associated driver software. The plant controller 202 may utilize dedicated processors or co-processors in combination with application software to perform its functions. The plant controller 202 may also be employed in a master-slave configuration with other controllers to coordinate operation of the photovoltaic power plant 200 with reactive power sources, such as static VAR compensators and capacitive banks.

In the example of FIG. 3, a global inverter reactive power setpoint signal is processed from function blocks 302-306. From the function block 306, an individual inverter reactive power setpoint signal is sent to each inverter 110. An inverter 110 exports/absorbs reactive power based on received inverter reactive power setpoint.

Referring to FIG. 3, the plant controller 202 receives a reference voltage $V_{REF}$ that is employed as a setpoint voltage for setting the voltage at the POI 204. A summer 301 generates an error signal $V_{ERR}$ based on the difference between the desired voltage at the POI 204 as indicated by the reference voltage $V_{REF}$ and the voltage at the POI 204 as measured by the meter 205 ($V_{METER}$).

In one embodiment, the reference voltage $V_{REF}$ and the meter voltage reading $V_{METER}$ are processed in the plant controller 202 as digital signals. These voltages may be converted to digital using an analog to digital converter (ADC), and then provided to the plant controller 202 over a data communications network. As a particular example, the reference voltage $V_{REF}$ and the meter voltage reading $V_{METER}$ may be provided to the plant controller 202 by way of ModbusTCP registers. Bounds checking may be performed on commands and inputs (including the reference voltage $V_{REF}$ and the meter voltage reading $V_{METER}$) received by the plant controller 202.

The reference voltage \T$_{REF}$, the meter voltage reading $V_{METER}$, and other voltages/currents in the photovoltaic power plant may be represented by other types of signals with appropriate changes to the rest of the photovoltaic power plant 200. For example, a voltage signal may be represented by a current signal, and vice versa. As another example, voltages and currents in the photovoltaic power plant may be represented in RMS (root mean square).

An unloading deadband function 302 may or may not be enabled depending on the application. The unloading deadband function 302 allows the error voltage $V_{ERR}$ to vary within a range without adjusting the control signal to the inverters 110. More specifically, the unloading deadband function 302 allows the input to the compensator 303 to vary up or down when the grid voltage (i.e., the voltage at the POI 204) is within bounds (typically ±1% of nominal), and keep the inverters 110 at a setting such that the inverters 110 export a unity power factor. In other words, if the grid voltage is within ±1%, for example, the input to the compensator 303 is actually just the grid voltage. This will also cause the inverters 110 to go to unity power factor if the grid voltage is within the deadband limits.

In one embodiment, a compensator 303 generates a global inverter reactive power setpoint signal from the error voltage $V_{ERR}$ using a proportional-integral (PI) control scheme. Other control schemes that may be used include proportional, integral, derivative, proportional-integral, integral-derivative, proportional-derivative, and proportional-integral-derivative. The PI compensator 303 may be absolute, which means the inverter reactive power setpoint is biased up or down based on the error signal $V_{ERR}$ and the proportional gain (Kp) and integral gain (Ki) of the PI compensator 303. The compensator 303 may also be incremental. The compensator 303 may have integral windup protection and saturation limits. The compensator 303 may be enabled or disabled due to state machine logic that is triggered when grid disturbances occur.

A reactive power limit select function 304 is configured to reduce or increase the inverter reactive power setpoint signal output of the compensator 303 based on inputs from the inverter voltage limiter sub-loop 330, power factor limiter sub-loop 331, and reactive power limiter sub-loop 332. The reactive power limit select function 304 adjusts the inverter reactive power setpoint signal such that an inverter 110 does not generate an output that exceeds a voltage limit ($V_{INV}$ limit), a power factor limit (PF limit) and a reactive power limit (Q limit).

The inverter voltage limiter sub-loop 330 is configured to limit the inverter reactive power setpoint based on the voltage output at the terminals of the inverters 110. In one embodiment, the terminal voltages of all the inverters 110 in the photovoltaic power plant 200 are averaged together to generate a single inverter terminal voltage representing the terminal voltage of all the inverters 110. In another embodiment, the highest inverter terminal voltage among all the inverters 110 is used to represent the terminal voltage of all the inverters 110. The inverter terminal voltage (averaged, highest, or other representation of terminal voltages of the inverters 110) is filtered by a voltage filter 341 and compared to an inverter reference voltage limit $V_{INV}$ limit by a summer 309. The output of the summer 309 is input to the compensator 308, which provides its output to the reactive power limit select function 304. Unlike the power factor and reactive power sub-loops, the inverter voltage limiter sub-loop 330 gets its measurement directly from the inverters 110 (not from the meter 205). The inverter voltage limiter sub-loop 330 has its own compensator 308 because the voltage at the POI 204 is not necessarily the same as the voltage at the inverter terminals due to impedance changes with real power flowing through the plant AC collection system. The compensator 308 may employ a PI or other control scheme.

The power factor limiter sub-loop 331 is configured to limit the inverter reactive power setpoint when the power factor measured by the meter 205 at the POI 204 is close to, at, or over a power factor limit (PF Limit) of the photovoltaic power plant 200. The power factor reading from the meter 205 is filtered by a power factor filter 342 and compared to the power factor limit by a summer 313. The difference between the power factor reading from the meter 205 and the power factor limit is input to the compensator 310, which provides its output to the reactive power limit select function 304. The power factor limiter sub-loop 331 has its own compensator 310 because the power factor at the POI 204 is not necessarily the same as the power factor at the inverter terminals due to impedance changes with real power flowing through the plant AC collection system. The compensator 310 may employ a PI or other control scheme.

The reactive power limiter sub-loop 332 is configured to limit the inverter reactive power setpoint when the reactive power measured by the meter 205 at the POI 204 is close to, at, or over a reactive power limit (Q Limit) of the photovoltaic power plant 200. The reactive power reading from the meter 205 is filtered by a reactive power filter 343 and compared to the reactive power limit by a summer 312. The difference between the reactive power reading from the meter 205 and the reactive power limit is input to the compensator 311, which provides its output to the reactive power limit select function 304. The reactive power sub-loop 332 has its own compensator 311 because reactive power factor at the POI 204 is not necessarily the same as at the reactive power at the inverter terminals due to impedance changes with real power flowing through the plant AC collection system. The compensator 311 may employ a PI or other control scheme.

A reactive power rate of change limit function 305 limits the rate of change of the inverter reactive power setpoint signal. This protects against rapid and drastic changes to the inverter reactive power setpoint.

An inverter available function 306 periodically receives heartbeat signals 340 to detect inverter outages. Only one heartbeat signal 340 from one inverter 110 is shown in FIG. 3 for clarity of illustration. In practice, a separate heartbeat signal 340 may be received from each inverter 110. For each available inverter 110, the inverter available function 306 outputs a corresponding inverter reactive power setpoint signal to an individual reactive power rate of change limit function 307.

The individual reactive power rate of change limit function 307 is applied to each individual inverter reactive power setpoint signal that is provided to a corresponding inverter 110. In one embodiment, an inverter reactive power setpoint signal (Inv Q SP) is provided to a corresponding inverter 110 by way of a ModbusTCP register. An inverter reactive power setpoint signal is read from the register and converted to an analog voltage signal, which is then presented to a terminal of the inverter 110 at the inverter pad 220 where the inverter 110 is located The individual reactive power rate of change limit function 307 is also configured to ramp an inverter reactive power setpoint up or down in response to inverter outages. For example, if an inverter 110 is offline (e.g., missing a heartbeat), the function 307 may set the inverter reactive power setpoint for that inverter 110 to unity power factor or zero reactive power. When that inverter 110 goes back online, the function 307 may set the inverter reactive power setpoint for that inverter 110 back to the global reactive power setpoint as dictated by AVR.

Figure 4:
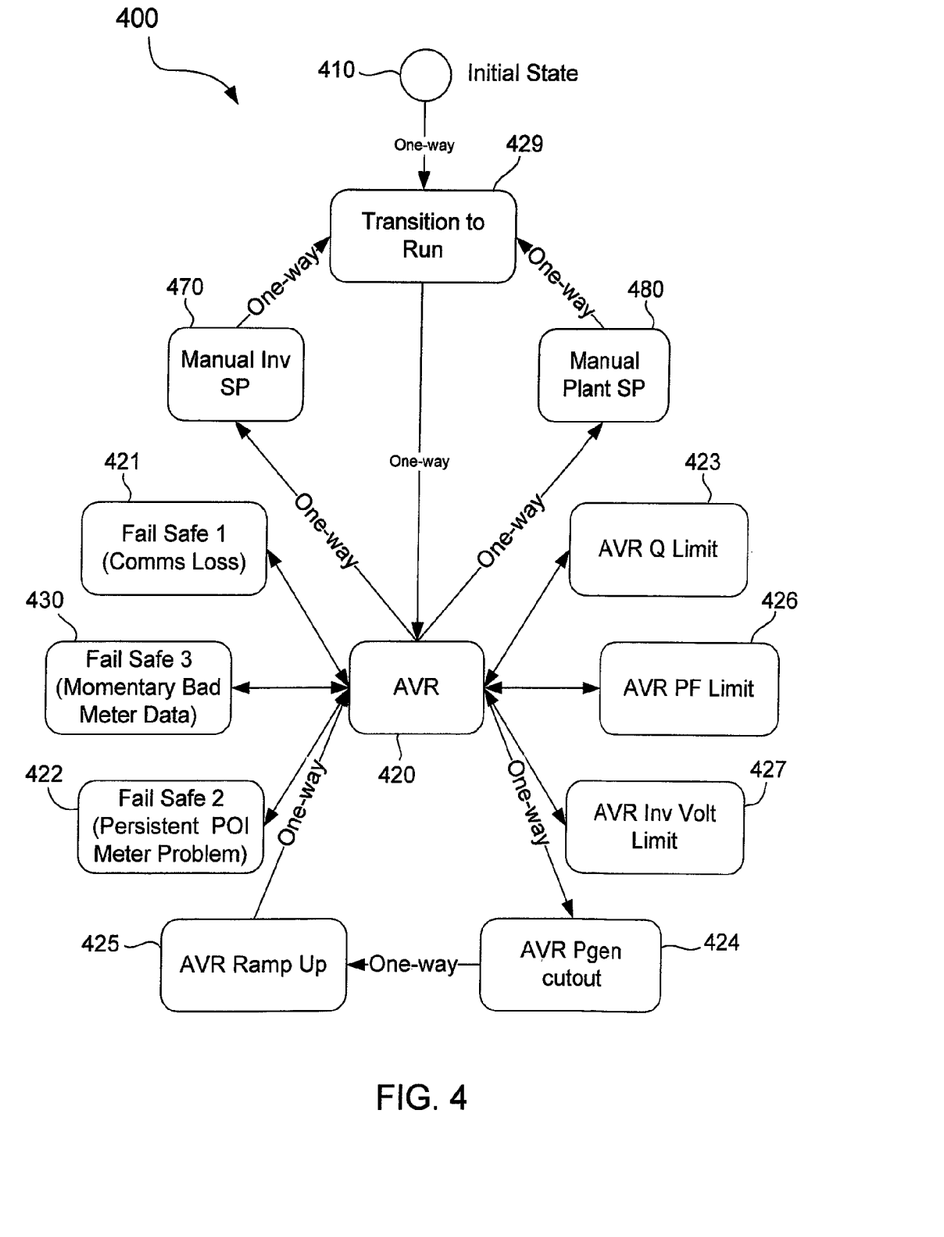
FIG. 4 shows a state diagram of a state machine for automatic voltage regulation of a photovoltaic power plant in accordance with an embodiment of the present invention.

FIG. 4 shows a state diagram of the state machine 400 for automatic voltage regulation of a photovoltaic power plant in accordance with an embodiment of the present invention. The plant controller 202 (see FIG. 2) may perform the actions dictated by the state machine 400.

In the state machine 400, the states 423, 424, 425, 426, 427, and 429 represent a condition where the AVR is on but voltage control is lost due to the photovoltaic power plant 200 reaching a reactive power, power factor, voltage, or minimum real power generation limit. The states 470 and 480 represent a condition where the reactive power setpoint of the photovoltaic power plant 200 (i.e., reactive power setpoint for the entire power plant) and of the inverters 110 are manually set, there is no closed loop control, and AVR is turned off. The states 421, 422, and 430 represent a condition where a momentary (in the case of states 421 and 430) or persistent (in the case of the state 422) anomalous condition is detected, and the last value of the global inverter reactive power setpoint is held.

The state machine 400 begins from an initial state 410, which is the default state when the state machine 400 is initialized. From the initial state 410, the state machine 400 transitions to the transition to run state 429. In the state 429, proportional-integral-derivative (PID), or other control schemes, of the photovoltaic power plant 200 performs a scan cycle to initialize. In one embodiment, the PID control scheme is employed in states 420, 423, 426, 427, and 425. Input parameters are also checked in the state 429 to validate that AVR can be enabled.

From the state 429, the state machine 400 transitions to the AVR state 420, where closed loop control is enabled and working correctly, and the grid voltage is within a setpoint deadband. More particularly, in the state 420, AVR is enabled and running in closed loop control. In the state 420, the AVR control scheme controls the power plant and inverter reactive power setpoints to control the voltage at the POI 204. A setpoint deadband may allow the grid voltage measured at the POI 204 to vary +/-1%, for example, before the inverters 110 are commanded to provide reactive power. From the state 420, the state machine 400 may transition to other states depending on conditions of the photovoltaic power plant 200.

The state machine 400 transitions from the AVR state 420 to the manual inverter setpoint state 470 and to the manual plant setpoint state 480 when AVR is turned off and not enabled. Instead, the inverters 110 (state 470) and the photovoltaic plant 200 (state 480) are commanded to a specific reactive power setpoint, which may indicate a specific reactive power in kVAR. In one embodiment, bumpless transfer is used when switching modes, i.e., transitioning from AVR control (state 420) to manual control (states 470 and 480) of reactive power setpoints. To get back to AVR mode, the state machine 400 transitions from states 470 and 480 to the transition to run state 429, and then to the AVR state 420.

The state machine 400 transitions from the AVR state 420 to the fail safe state 421 upon occurrence of momentary loss of communications with the POI meter, which in this example is the meter 205. In the state 421, the AVR routine holds the global inverter reactive power setpoint at its last position (i.e., last value). The state machine 400 automatically transitions back to the state 420 to resume AVR when the communications problem with the POI meter is resolved.

The state machine 400 transitions from the AVR state 420 to the fail safe state 430 upon occurrence of momentary erroneous POI meter readings. For example, the transition from the state 420 to the state 430 may occur when the meter 205 gives suspect real power, reactive power, power factor, or current readings, such as when the meter 205 gives readings that are out of allowable range, for a brief moment. In the state 430, the automatic voltage regulation routine holds the inverter reactive power setpoints at their last position. The state machine 400 automatically transitions back to the state 420 to resume AVR when the problem with the readings of the meter 205 clears.

The state machine 400 transitions from the AVR state 420 to the fail safe state 422 upon occurrence of persistent erroneous POI meter-related problems, such as persistent erroneous POI meter readings or persistent POI meter communications failure. For example, the transition from the state 420 to the state 422 may occur when the meter 205 persistently gives suspect real power, reactive power, power factor, or current readings, such as when the meter 205 gives readings that are out of allowable range. As another example, the state machine 400 may transition from the state 420 to the state 422 when communications with the meter 205 cannot be established for more than a predetermined amount of time. Since the state 422 is for a condition where there is a persistent, as opposed to momentary or temporary, POI meter related problem, the AVR routine is configured to ramp the global inverter reactive power setpoint to unity power factor. The state machine 400 automatically transitions back to the state 420 to resume automatic voltage regulation when the problem with the POI meter clears.

The state machine 400 transitions from the AVR state 420 to the AVR power factor limit state 426 when the power factor of the photovoltaic power plant 200 exceeds the maximum allowable power factor PFmax as measured by the POI meter, i.e., at the POI 204. The state 426 reduces the power factor of the power plant 200 to a value that is lower than the maximum allowable power factor PFmax. The power factor of the photovoltaic power plant 200 may be detected and processed by way of the power factor limiter sub-loop 331 (see FIG. 3). In the state 426, the inverter reactive power setpoints may be held steady or modified to bring the plant power factor value to within allowable limits. The state machine 400 automatically transitions back to the state 420 when the power factor of the photovoltaic power plant 200 returns to allowable limits.

The state machine 400 transitions from the AVR state 420 to the AVR reactive power limit state 423 when the reactive power exported by the photovoltaic power plant 200 as measured by the POI meter exceeds the maximum allowable reactive power Qmax. The state 423 reduces the reactive power of the plant to a value that is lower than the maximum allowable reactive power Qmax. The reactive power exported by the photovoltaic power plant 200 may be detected and processed by way of the reactive power limiter sub-loop 332 (see FIG. 3). In the state 423, the inverter reactive power setpoints may be held steady or modified to bring the plant reactive power value within allowable limits. The state machine 400 automatically transitions back to the state 420 when the reactive power exported by the photovoltaic power plant 200 returns to allowable limits.

The state machine 400 transitions from the AVR state 420 to the AVR inverter voltage limit state 427 when the inverter terminal voltage (e.g., average of the voltages at the terminals of the inverters 110) reaches the maximum allowable terminal voltage. The inverter terminal voltage may be detected and processed by way of the voltage limiter sub-loop 330 (see FIG. 3). In the state 427, the inverter reactive power setpoints may be held steady or modified to bring the inverter terminal voltage to within allowable limits. The state machine 400 automatically transitions back to the state 420 when the inverter terminal voltage returns to allowable limits.

The state machine 400 transitions from the AVR state 420 to the AVR real power generated cutout state 424 when the real power generated by the photovoltaic power plant 200 goes below a minimum real power generation level. The real power generated by the photovoltaic power plant 200 may be read by the plant controller 202 from the POI meter (see meter 205, FIG. 2). In the state 424, the inverter reactive power setpoints are ramped gradually to a unity setpoint. The state machine 400 remains in the state 424 until real power generation levels rise above an enabling level that is higher than a minimum real power resume generation level for hysteresis.

The state machine 400 transitions from the AVR state 420 to the AVR ramp up state 425 when the state machine 400 was previously in the state of low real power generation state (i.e., state 424), the real power generated by the photovoltaic power plant 200 rises above the enabling level, and the inverter reactive power setpoints now ramp up to the appropriate values for AVR control. The state machine 400 automatically transitions from the state 425 to the state 420 when the real power generated by the photovoltaic plant 200 rises above the minimum real power generation level.

Figure 5:
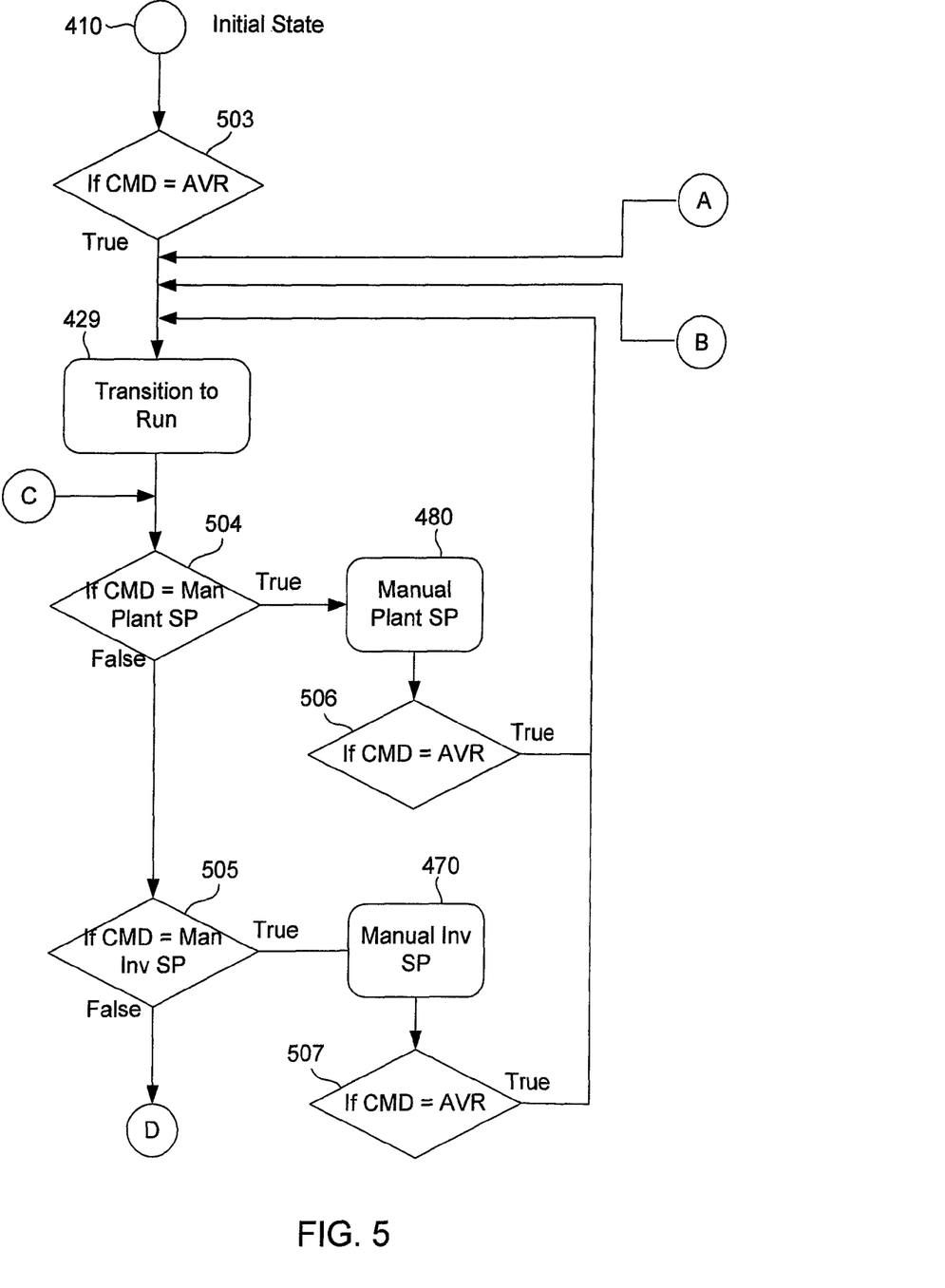
FIGS. 5-7 show a flow diagram of a method of controlling operation of a photovoltaic power plant in accordance with an embodiment of the present invention.
Figure 6:
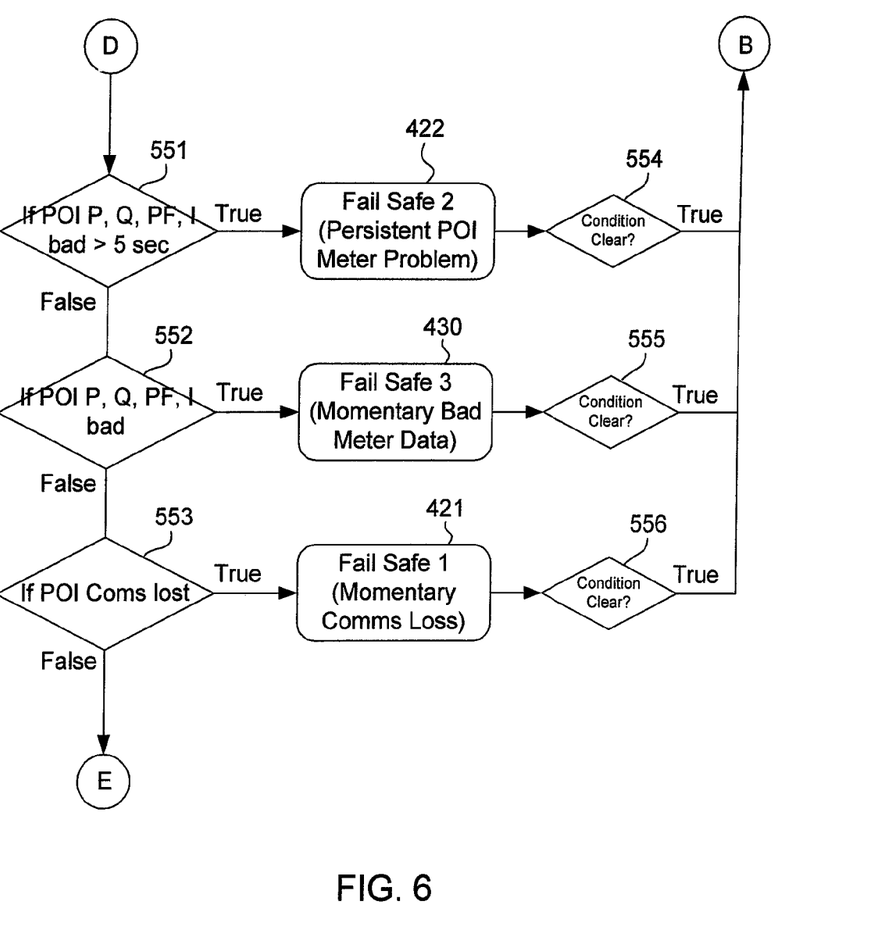
Figure 7:
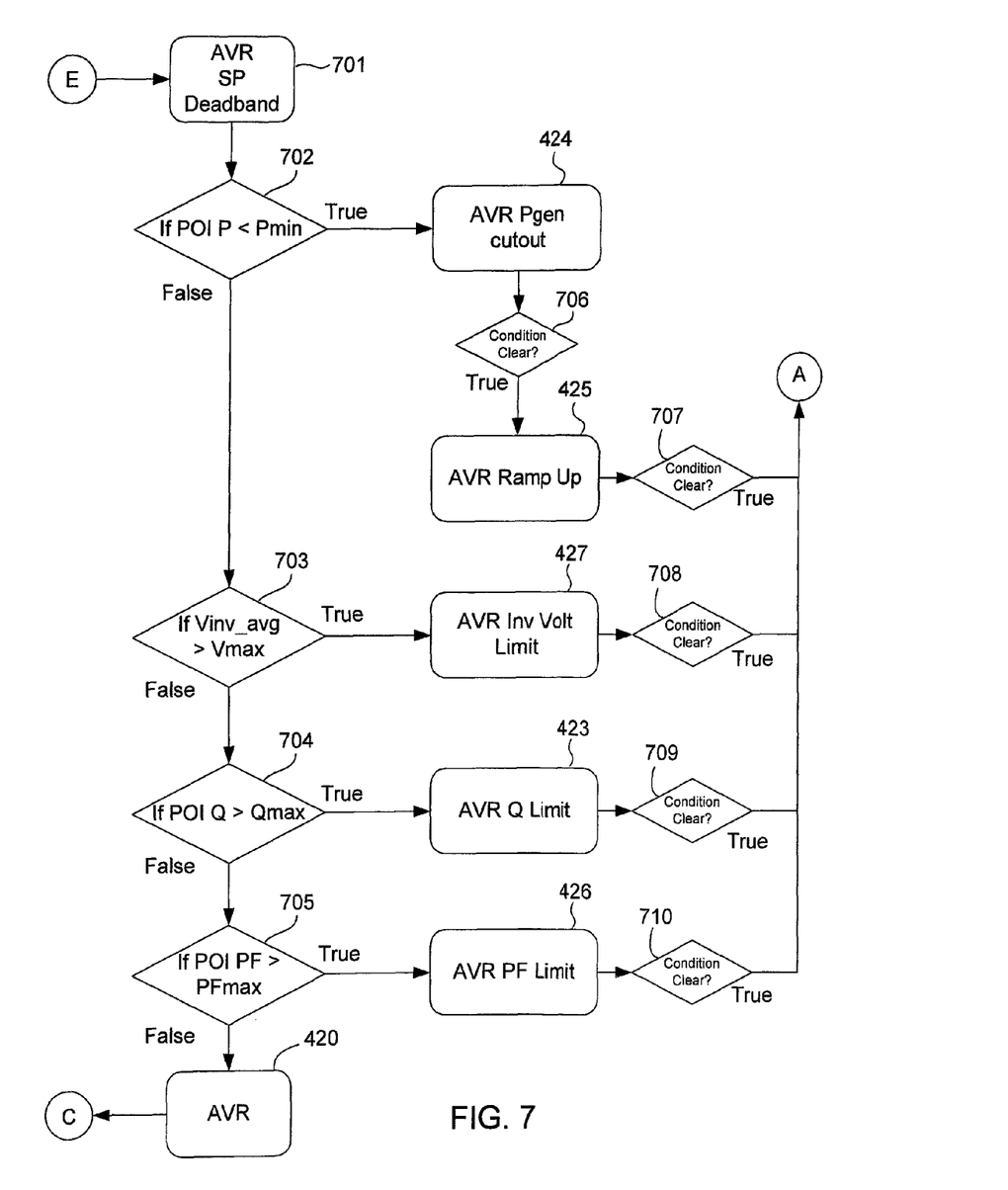

FIGS. 5-7 show a flow diagram of a method of controlling operation of a photovoltaic power plant in accordance with an embodiment of the present invention. The flow diagram of FIGS. 5-7 show details of the operation of the state machine 400 as performed by the plant controller 202.

Beginning with FIG. 5, the state machine 400 begins in the initial state 410. When the state machine 400 receives a command to go to AVR mode (block 503), the state machine 400 transitions to the transition to run state 429. The plant operator may also issue a command to turn on AVR. Prior to transitioning from the state 429 to the AVR state 420, a series of checks are performed to validate that AVR can be enabled.

In the transition to run state 429, the state machine 400 checks for a command to run in manual inverter setpoint mode. If there is a command to run in manual plant reactive power setpoint mode (block 504), the state machine 400 transitions to the manual plant setpoint state 480, and stays in the state 480 until a command to go to automatic voltage regulation mode is received (block 506). Similarly, if there is a command to run in manual inverter reactive power setpoint mode (block 505), the state machine 400 transitions to the manual inverter setpoint state 470, and stays in the state 470 until a command to go to automatic voltage regulation mode is received (block 507).

The communications with and readings of the POI meter are checked for proper operation (node "D" of FIG. 5 to node "D" of FIG. 6). The state machine 400 may enter the fail safe state 422 when the POI meter readings (e.g., real power, reactive power, power factor, and current) are persistently bad (block 551), such as when the readings are bad for a time greater than 5 seconds, or when communications with the POI meter is lost and cannot be reestablished within a predetermined period of time. The state machine 400 enters the fail safe state 430 when the POI meter readings are momentarily bad (block 552), such as when the readings are bad for a time less than 5 seconds. The state machine 400 enters the fail safe state 421 when communications with the POI meter are momentarily lost (block 553). The state machine 400 returns to the beginning of the transition to run state 429 when these POI meter related problems are cleared (blocks 554, 555, and 556; node "B" of FIG. 6 to node "B" of FIG. 5).

The state machine 400 may include a setpoint deadband (block 701; node "E" of FIG. 6 to node "E" of FIG. 7). In one embodiment, the setpoint deadband allows the grid voltage measured at the POI 204 to vary+/−1%, for example, before the inverters 110 are commanded to provide reactive power.

The real power generated by the photovoltaic power plant 200 is compared against the minimum real power generation level (block 702). When the real power generated by the photovoltaic power plant 200 reaches the minimum real power generation level, the state machine 400 enters the AVR real power generation cutout state 424 to unity the inverter reactive power setpoints to unity. When the real power generated by the photovoltaic system 200 rises above an enabling level (block 706), the state machine 400 enters the AVR ramp up state 425 to ramp up the inverter reactive power setpoints to appropriate values for AVR control (block 707). The state machine 400 then returns to the beginning of the transition to run state 429 (node "A" of FIG. 7 to node "A" of FIG. 5).

The state machine 400 enters the AVR inverter voltage limit state 427 when the average terminal voltage of the inverters 110 exceeds the maximum allowable terminal voltage (block 703). In the example of FIG. 7, the average of the terminal voltages of the inverters 110 (Vinv_avg) is considered the inverter terminal voltage for comparison to the maximum allowable terminal voltage Vmax. The state machine 400 enters the AVR reactive power limit state 423 when the reactive power exported by the photovoltaic power plant 200 exceeds the maximum allowable reactive power Qmax (block 704). The state machine 400 enters the AVR power factor limit state 426 when the power factor of the photovoltaic power plant 200 exceeds the maximum allowable power factor PFmax (block 705). The state machine 400 returns to the beginning of the transition to run state 429 when these conditions are cleared (blocks 708, 709, and 710; node "A" of FIG. 7 to node "A" of FIG. 5).

From the transition to run state 429 (see FIG. 5), the state machine 400 transitions to the AVR state 420 when the above-described series of checks validate that automatic voltage regulation mode can be entered. From the automatic voltage regulation mode of state 420, the state machine 400 may enter other states depending on subsequent condition of the photovoltaic power plant 200.

Figure 8:
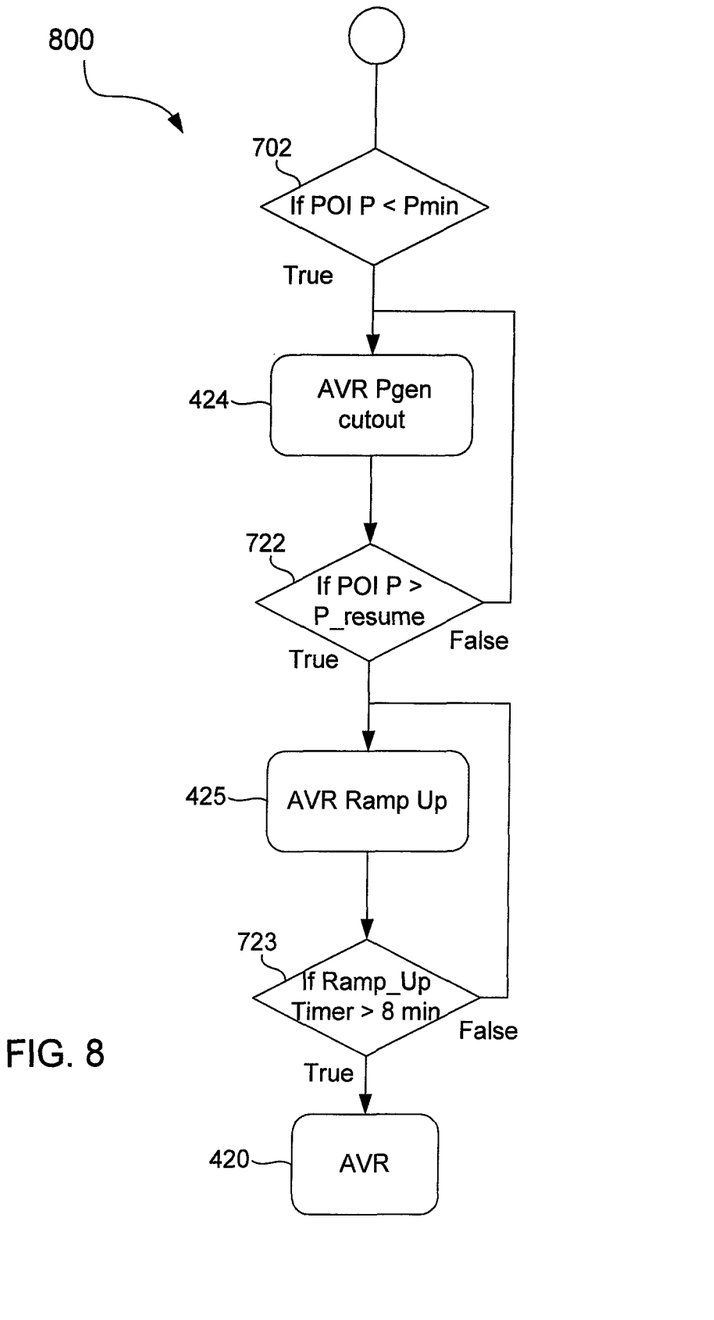
FIG. 8 shows a flow diagram of a method of controlling operation of a photovoltaic power plant in accordance with an embodiment of the present invention.

FIG. 8 shows a flow diagram of a method 800 of controlling operation of a photovoltaic power plant in accordance with an embodiment of the present invention. In the example of FIG. 8, the method 800 comprises operations of the state machine 400 involving the states 424 and 425. In the method 800, the real power generated by the photovoltaic power plant 200 is compared against a trigger point, which is the minimum real power generation level in the example of FIG. 8 (block 702; see also FIG. 7). When the real power generated by the photovoltaic power plant 200 is below the minimum real power generation level Pmin as measured by the POI meter, the state machine 400 enters the AVR real power generated cutout state 424 to ramp down the inverter reactive power setpoints to unity power factor (i.e., 1.0 PF or zero kVar) (block 424). When the real power generated by the photovoltaic system 200 rises above the enabling level P_resume (block 722), the state machine 400 enters the AVR ramp up state 425 to ramp up the inverter reactive power setpoints to appropriate values for AVR control. In one embodiment, the ramp up of inverter reactive power setpoints under state 425 is performed for at least 8 minutes (block 723), for example, to reach steady state before the photovoltaic power plant 200 is placed in AVR mode by entering the AVR state 420. The ramp up period interval may be optimized for particular photovoltaic power plants based on power plant generation size, reactive power needs, or other power plant and region characteristics.

The method 800 addresses a problem that concerns photovoltaic power plants. AVR by itself may not be able to regain tight control of the POI voltage when certain transient conditions occur. For example, in the morning when the inverters come online, the inverters may awake from sleep mode because enough DC (direct current) voltage is present to export power. However, when the inverters start gating and exporting power under this condition, the inverters may sense there is not enough power to export and would consequently shut down. The wake up and shutdown cycle may repeat for one or more inverters several times, and may perturb AVR. In the method 800, soft starting is performed by not entering AVR until the inverters can generate sufficient real power (P_resume) as measured at the POI in the case of the method 800 (see blocks 702 and 722) or at the inverter terminals. Once the inverters generate real power above the sufficient real power level, the inverter reactive power setpoints, which is a controlled variable of the AVR, may be smoothly ramped up in linear fashion to their final values as determined by the AVR control scheme. This allows the photovoltaic power plant to come online during the morning or from plant shutdowns in a smooth manner that is less likely to disturb the power grid or power plant operation.

Similarly, when the photovoltaic power plant is about to shutdown in the evening or for a scheduled shutdown (e.g., curtailment command), AVR may be soft stopped by ramping down in linear fashion the inverter reactive power setpoints to zero reactive power (0 kVar) or unity power factor over a defined period interval, which in the example of FIG. 8 is 8 minutes (see block 723). The period interval may be optimized for particular photovoltaic power plants based on power plant generation size, reactive power needs, or other power plant and region characteristics. Appropriate deadband may be configured between the soft start and soft stop thresholds such that the photovoltaic power plant does not inadvertently shutdown or startup repeatedly due to, for example, irradiance induced power fluctuations, inverter shutdown/startups, breaker trips, and so on.

In the method 800, the inverter reactive power setpoints are ramped to soft start or soft stop the AVR. In other embodiments, the power factor setpoints are ramped up to their final destination to soft start the AVR or ramped down to unity power factor or zero reactive power (0 kVar) to soft stop the AVR.

The above-described soft starting and soft stopping techniques are explained in terms of AVR as the primary control loop. Other primary control loops that may also benefit from the soft starting and soft stopping techniques include power factor control and reactive power control.

Figure 9:
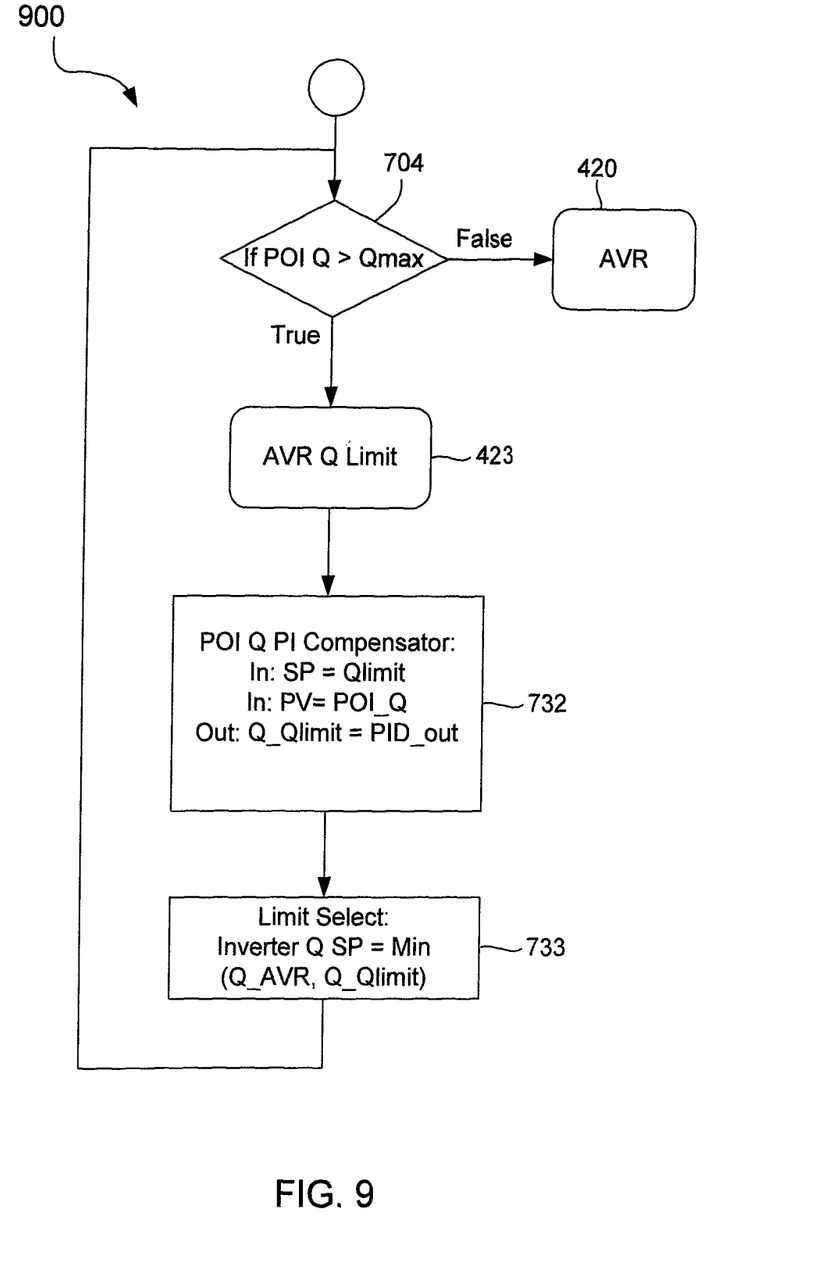
FIG. 9 shows a flow diagram of a method of controlling operation of a photovoltaic power plant in accordance with an embodiment of the present invention.

FIG. 9 shows a flow diagram of a method 900 of controlling operation of a photovoltaic power plant in accordance with an embodiment of the present invention. In the example of FIG. 9, the method 900 comprises operations of the state machine 400 involving the state 423. In the flow diagram of FIG. 9, the state machine 400 enters the AVR reactive power limit state 423 when the reactive power exported by the photovoltaic power plant 200, e.g., as measured at the POI 204, exceeds the maximum allowable reactive power Qmax (block 704; see also FIG. 7). Otherwise, the state machine 400 enters the AVR sate 420 assuming all other conditions for the AVR state 420 are satisfied. The PI compensator 311 ("POI Q PI Compensator" in block 732) of the sub-loop 332 (see FIG. 3) receives both the reactive power limit ("IN: SP=Qlimit" in block 732) and the POI meter reactive power reading ("IN: PV=POI_Q"). The output Q_Qlimit of the PI compensator 311 ("Out: Q_Qlimit=PID_out" in block 732) is input to the reactive power limit select function 304, which outputs the inverter reactive power setpoint as the lower of the setpoint Q_AVR set by the AVR and the output of Q_Qlimit of the PI compensator 311 (block 733).

Figure 10:
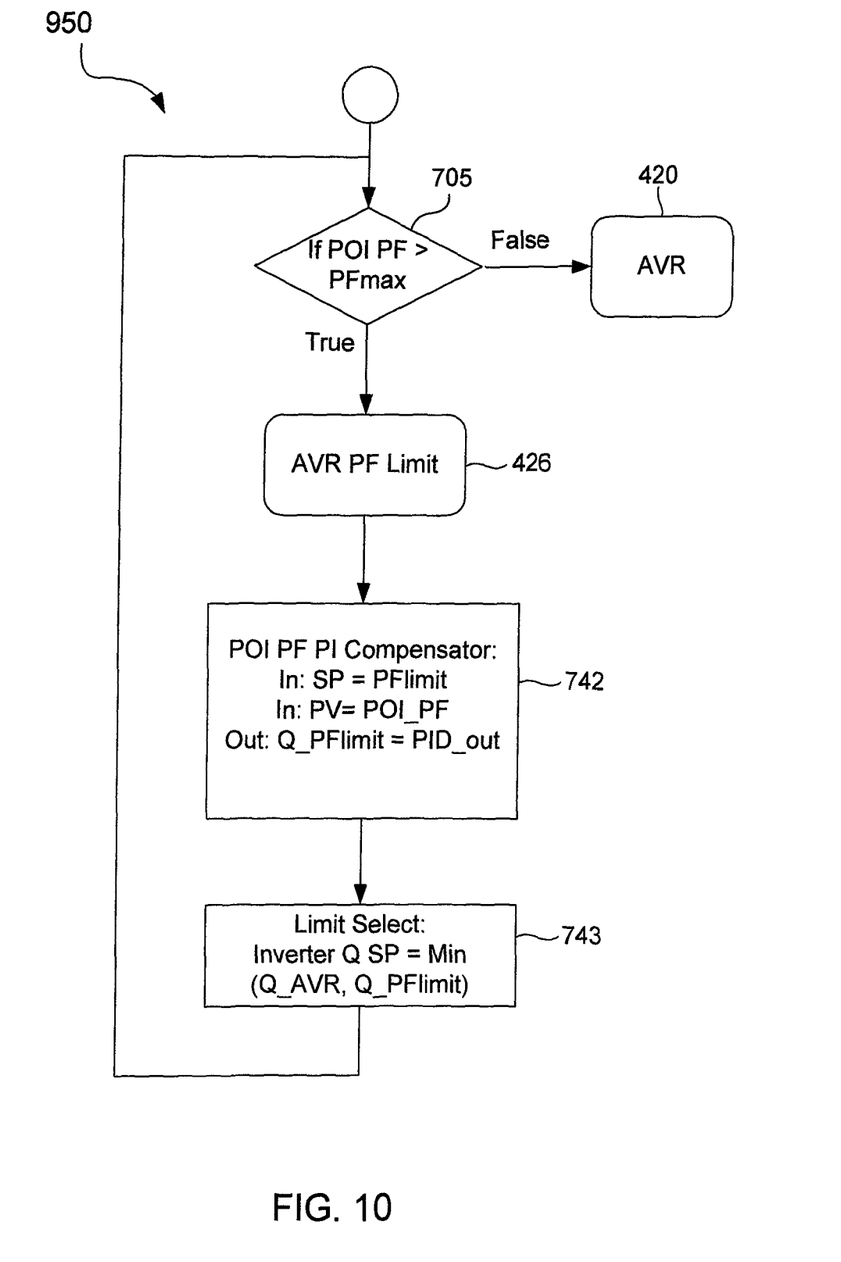
FIG. 10 shows a flow diagram of a method of controlling operation of a photovoltaic power plant in accordance with an embodiment of the present invention.

FIG. 10 shows a flow diagram of a method 950 of controlling operation of a photovoltaic power plant in accordance with an embodiment of the present invention. In the example of FIG. 10, the method 950 comprises operations of the state machine 400 involving the state 426. In the flow diagram of FIG. 10, the state machine 400 enters the AVR power factor limit state 426 when the power factor of the photovoltaic power plant 200 exceeds the maximum allowable power factor PFmax (block 705; see also FIG. 7). Otherwise, the state machine 400 enters the AVR sate 420 assuming all other conditions for the AVR state 420 are satisfied. The PI compensator 310 ("POI PF PI Compensator" of block 742) of the sub-loop 331 (see FIG. 3) receives both the power factor limit ("IN: SP=PFlimit) and the POI meter power factor reading ("IN: PV" POI_PF"). The output Q_PFlimit of the PI compensator 311 ("Out: Q_PFlimit=PID_out" in block 742) is input to the reactive power limit select function 304, which outputs the inverter reactive power setpoint as the lower of the setpoint Q_AVR set by the AVR and the output Q_PF limit of the PI compensator 311 (block 743).

Often, a photovoltaic power plant is not required to export or absorb all the reactive power that the inverters are capable of exporting or absorbing. Sometimes, a contractual agreement may indicate what reactive power and/or power factor the photovoltaic power plant must be capable of exporting or absorbing. If the photovoltaic power plant allows the full export/absorb of inverter reactive power, the inverters may curtail real power output of the photovoltaic power plant due to the inverters' apparent power limit. The methods 900 and 950 address these problems associated with photovoltaic power plants by dynamically limiting the power plant reactive power in the case of the method 900 and power factor in the case of the method 950. The limits are dynamic in that they utilize a process value measurement from the point of interconnection (or some other location) instead of using the capability of the inverters. The dynamic limits may account for changes in reactive power exporting/absorbing that occurs within the photovoltaic generation facility AC collection, transformers, filters, switching elements, etc.

For example, in the case of the method 900, if the reactive power generated by the power plant exceeds the maximum allowable reactive power for the power plant, a lower reactive power limit is incurred on the inverter reactive power setpoints. The lower reactive power limit on the inverter reactive power setpoints brings the power plant reactive power limit down to a desired limit. If the magnitude of the reactive power generated by the power plant is below the maximum allowable reactive power for the power plant, the lower reactive power limit imposed in the state 423 on the inverter reactive power setpoints is removed by going back to AVR mode in state 420. The lower reactive power limit imposed on the inverter reactive power setpoints in the state 423 may also be raised slightly to stay in the state 423 when the magnitude of the plant reactive power has a value that is very close to or approximately the same as the lower reactive power limit in the state 423 to allow the inverters to operate near the plant reactive power limit.

Similarly, in the case of the method 950, a limit is incurred on the inverter power factor setpoints when the plant power factor exceeds the maximum allowable power factor. The lower inverter power factor limit on the inverter power factor setpoints brings the plant power factor down to a desired limit. If the magnitude of the plant power factor is below the maximum allowable plant power factor, the lower inverter power factor limit imposed on the plant power factor setpoint in the state 426 is removed by going back to AVR mode in state 420. The lower plant power factor limit imposed on the inverter power factor setpoints in the state 426 may also be raised slightly to stay in the state 426 when the magnitude of the plant power factor has a value that is very close to or approximately the same as the lower plant power factor limit in the state 426 to allow the inverters to operate near the plant power factor limit.

The dynamic limits of the methods 900 and 950 may be imposed and controlled at the same time. Furthermore, while the methods 900 and 950 are described in terms of AVR, the methods 900 and 950 may also be applied to automatic power factor control, reactive power control, emergency VAR support control, and other control schemes.

Figure 11:
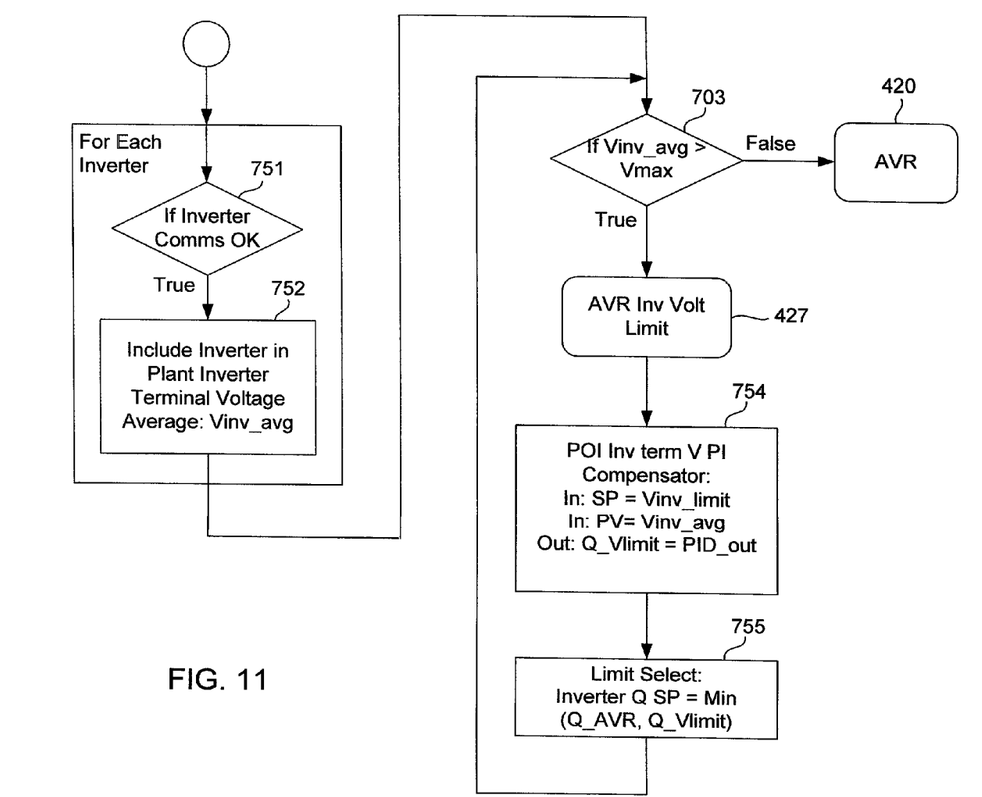
FIG. 11 shows a flow diagram of a method of controlling operation of a photovoltaic power plant in accordance with an embodiment of the present invention.

FIG. 11 shows a flow diagram of a method of controlling operation of a photovoltaic power plant in accordance with an embodiment of the present invention. The flow diagram of FIG. 11 shows further details of the state machine 400 involving the state 427. In the flow diagram of FIG. 11, each inverter 110 that is communicating properly with the plant controller 202 (block 751) is included in the group of inverters 110 whose terminal voltages are averaged together to form an inverter terminal voltage signal (block 752). The state machine 400 enters the AVR inverter voltage limit state 427 when the average terminal voltage of the inverters 110 exceeds the maximum allowable terminal voltage Vmax (block 703; see also FIG. 7). Otherwise, the state machine 400 enters the AVR sate 420 assuming all other conditions for the AVR state 420 are satisfied. The PI compensator 308 ("POI Inv term V PI Compensator" of block 754) of the sub-loop 330 (see FIG. 3) receives both the inverter reference voltage limit ("IN: Vinv=Vinv_limit) and the average inverter terminal voltage ("IN: PV=Vinv_avg"). The output Q_Vlimit of the PI compensator 308 ("Out: Q_Vlimit=PID_out" in block 754) is input to the reactive power limit select function 304, which output the inverter reactive power setpoint as the lower of the setpoint Q_AVR set by the AVR and the output Q_Vlimit of the PI compensator 308 (block 755).

An improved automatic voltage regulation technique for photovoltaic power plants has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of controlling a photovoltaic power plant, the method comprising:
providing a reactive power setpoint to a photovoltaic inverter that converts direct current generated by a plurality of solar cells to alternating current;
detecting a real power output of the photovoltaic power plant at a point of interconnection (POI) of the photovoltaic power plant to a power grid;
comparing the real power output of the photovoltaic power plant to a minimum real power generation level; and
changing the reactive power setpoint to unity power factor in response to detecting that the real power output of the photovoltaic power plant is below the minimum real power generation level.

2. The method of claim 1, further comprising:
detecting, using a meter, an output of the photovoltaic power plant at the POI; and
reading the meter to detect the real power output of the photovoltaic power plant.

3. The method of claim 1, further comprising:
increasing the reactive power setpoint in response to detecting that the real power output of the photovoltaic power plant is above an enabling real power generation level.

4. The method of claim 2, further comprising: receiving and processing readings from the meter using a compensator.

5. The method of claim 4, wherein the compensator comprises a proportional-integral (PI) compensator.

6. A method of controlling a photovoltaic power plant, the method comprising:

providing a setpoint variable limit to a photovoltaic inverter that converts direct current generated by a plurality of solar cells to alternating current;

detecting an output of the photovoltaic power plant at a point of interconnection (POI) to a power grid in a first state of operation; and dynamically adjusting the setpoint variable limit from a first inverter setpoint to a second inverter setpoint to lower a limit on a reactive power output of the photovoltaic inverter when the output of the photovoltaic power plant exceeds a maximum allowable reactive power or power factor of the photovoltaic power plant.

7. The method of claim 6, wherein the output of the photovoltaic power plant detected at the POI comprises a reactive power output and the setpoint variable limit comprises an inverter reactive power setpoint.

8. The method of claim 6, wherein the output of the photovoltaic power plant detected at the POI comprises a power factor output and the setpoint variable limit comprises an inverter power factor setpoint.

9. The method of claim 6, wherein the output of the photovoltaic power plant at the POI is detected using a meter.

10. The method of claim 9, further comprising:
receiving and processing a reading of the meter in a compensator.

11. The method of claim 10, further comprising:
after receiving and processing the reading of the meter in the compensator, providing the reading of the meter to a plant controller that adjusts the setpoint variable limit.

12. The method of claim 10, wherein the compensator comprises a proportional-integral (PI) compensator.

13. The method of claim 6, wherein the photovoltaic power plant is controlled using automatic voltage regulation (AVR) in the first state of operation.

14. A method of controlling a photovoltaic power plant, the method comprising:
detecting an output of the photovoltaic power plant that is provided to a power grid;

comparing the output of the photovoltaic power plant to a maximum allowable output limit of the photovoltaic power plant, the maximum allowable output limit being a maximum allowable reactive power or power factor of the photovoltaic power plant; and in response to detecting that the output of the photovoltaic power plant exceeds the maximum allowable output limit, lowering a limit on a reactive power output of a photovoltaic inverter that converts direct current generated by a plurality of solar cells to alternating current.

15. The method of claim 14, wherein lowering the limit on the reactive power output of the photovoltaic inverter comprises:
lowering a setpoint variable limit of the photovoltaic inverter from a first inverter setpoint limit to a second inverter setpoint limit.

16. The method of claim 15, wherein the output of the photovoltaic power plant comprises reactive power exported or absorbed by the photovoltaic inverter, the maximum allowable output limit of the photovoltaic power plant comprises a maximum allowable reactive power exported by the photovoltaic power plant, and each of the first and second inverter setpoint limits comprises a reactive power setpoint limit of the photovoltaic inverter.

17. The method of claim 15, wherein detecting that the output of the photovoltaic power plant exceeds the maximum allowable output limit is performed in a first state of photovoltaic power plant operation and the lowering of the setpoint variable limit of the photovoltaic inverter from the first inverter setpoint limit to the second inverter setpoint limit is performed in a second state of photovoltaic power plant operation.

18. The method of claim 17, further comprising:
returning to the first state of photovoltaic power plant operation in response to detecting that the output of the photovoltaic power plant no longer exceeds the maximum allowable output limit of the photovoltaic power plant.

19. The method of claim 17, wherein the photovoltaic power plant is controlled by automatic voltage regulation (AVR) in the first state of photovoltaic power plant operation.

20. The method of claim 15, wherein the output of the photovoltaic power plant output comprises a power factor output, the maximum allowable output limit comprises a maximum allowable power factor of the photovoltaic power plant, and each of the first and second inverter setpoint limits comprises a power factor setpoint limit of the photovoltaic inverter.

* * * * *